United States Patent [19]

Greer

[11] Patent Number: 4,912,465
[45] Date of Patent: Mar. 27, 1990

[54] RUDDER POSITION INDICATOR

[75] Inventor: Gary M. Greer, Goshen, Ind.

[73] Assignee: Kreuter Marine Corporation, New Paris, Ind.

[21] Appl. No.: 91,272

[22] Filed: Aug. 31, 1987

[51] Int. Cl.⁴ .............................................. B63M 25/36
[52] U.S. Cl. ..................... 340/987; 340/686; 340/984
[58] Field of Search ............... 340/984, 987, 513, 524, 340/525, 686, 689, 815.03, 688, 953, 955; 116/26, 209, 35 R, 36, 226; 114/162, 284, 285; 440/2, 53

[56] References Cited

U.S. PATENT DOCUMENTS

| | | | |
|---|---|---|---|
| 1,377,427 | 5/1921 | O'Neil | 340/987 |
| 3,191,146 | 6/1965 | Mitchell | 340/955 |
| 3,548,400 | 12/1970 | Boyd et al. | 340/689 |
| 4,038,528 | 7/1977 | Fowler | 340/987 |
| 4,170,767 | 10/1979 | Tanner | 340/955 |
| 4,420,741 | 12/1983 | West | 340/984 |
| 4,459,115 | 7/1984 | Ballard | 340/689 |
| 4,652,878 | 3/1987 | Borgersen | 440/53 |
| 4,739,236 | 4/1988 | Burkenpas | 340/987 |

FOREIGN PATENT DOCUMENTS 0238004  8/1925  United Kingdom ............... 340/987

OTHER PUBLICATIONS

Catalog: "Teleflex Marine Systems," Teleflex, Inc., p. 51, Aug. 1987.

Primary Examiner—Joseph A. Orsino
Assistant Examiner—Brent A. Swarthout
Attorney, Agent, or Firm—Kinney & Lange

[57] ABSTRACT

A position indicator useful in determining the position of a rudder on a boat consists of apparatus and circuitry for causing a plurality of lights to light in such a way that all are on in a first color when the rudder is in a full port position, all are on in a second color when the rudder is in a full starboard position, and between full port and full starboard the lights change color and turn on and off into combinations indicative of the position of the rudder.

17 Claims, 1 Drawing Sheet

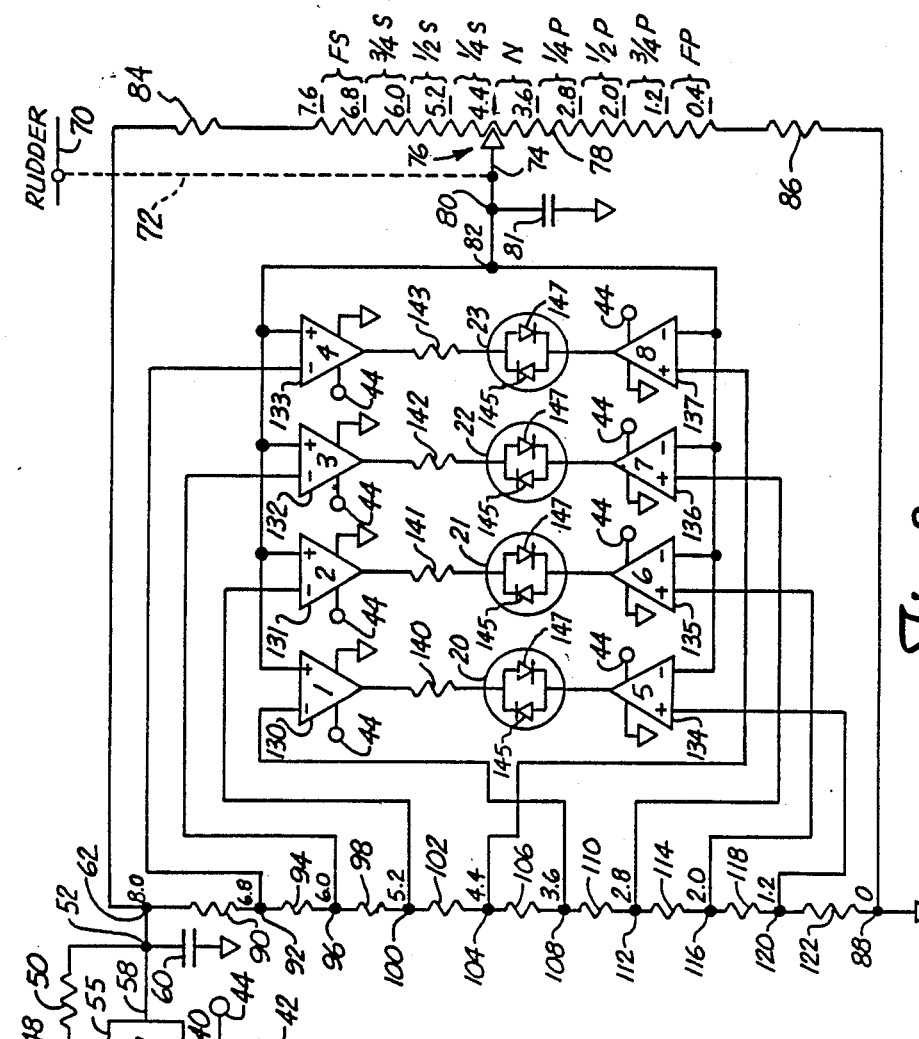
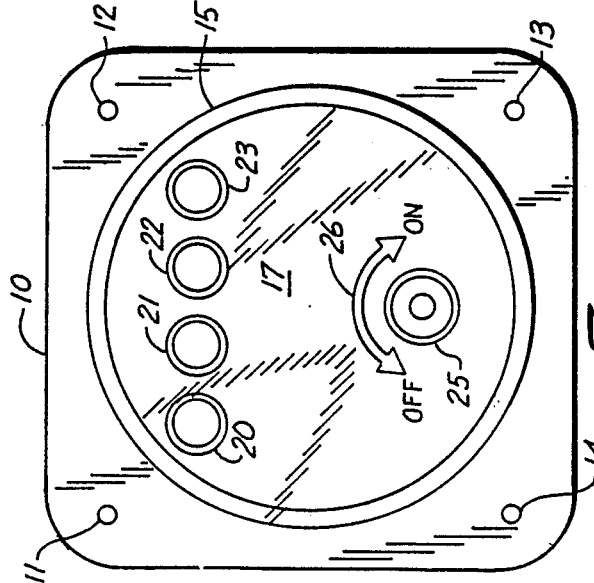
Fig. 2
Fig. 1

RUDDER POSITION INDICATOR

BACKGROUND OF THE INVENTION

1. Field of the Invention

The present invention relates to an indicator for indicating the position of an angularly movable member such as the rudder of a boat.

2. Description of the Prior Art

Prior art rudder position indicators have heretofore been adaptations of a standard voltmeter connected to the wiper of a rudder feedback potentiometer. The position of the voltmeter needle being indicative of the voltage existing on the potentiometer wiper which is controlled by the rudder will thus be indicative of the position of the rudder. "Port" and "Starboard" indicia are placed on the voltmeter dial to give the pilot a sense of rudder position.

Such indicators suffer from several undesirable problems. The voltmeter mechanism is subject to external forces such as vibration which may cause the needle to move about, sometimes erratically, making rudder position determination difficult. Also, with so few indicia, the actual rudder position in between must be estimated by the pilot.

SUMMARY OF THE INVENTION

The present invention overcomes these problems by eliminating the voltmeter type mechanism and utilizing, instead, a no-moving-part indicator employing, preferably, four lights each of which is capable of glowing in either of two distinguishable colors, as for example red and green. A circuit is provided for connection to the rudder feedback potentiometer for causing the lights to light in a predetermined sequence easily understood as indicating which of nine rudder positions the rudder occupies. For example, when the rudder is at a full port position, all four lights will be energized in the first color, "red." As the rudder is moved to a three-fourths full port position, the far right red light will extinguish leaving the three left lights on. As the rudder position is again moved to the one-half full port position, the two right-most red lights will extinguish leaving the two left-most lights glowing. At the one-fourth full port position, the three right lights will extinguish leaving the one left light glowing red to indicate one-fourth port. On the other side, at full starboard position, all four of the lights will be energized in the color green. As the rudder moves to the three-fourths full starboard position, the far left green light will extinguish leaving the three right green lights on. As the rudder moves to the one-half starboard position, the two left green lights will extinguish leaving the right two green lights glowing. At the one-fourth full starboard position, the three left green lights will extinguish leaving the one right green light energized. In the neutral position, halfway between the full starboard and full port positions, the far left red light and the far right green light will be on, with the middle two lights extinguished to indicate a neutral or straight ahead position.

A unique circuit arrangement for energizing the lights in the above fashion from the output of the rudder feedback potentiometer involves the use of a plurality of comparator circuits each having a first input connected to a different magnitude one of nine different reference voltages and a second input connected to the wiper of the rudder feedback potentiometer. Each comparator will produce an output whenever a positive input thereto exceeds a negative input thereto. The outputs of the comparator circuits are connected to the dual color lights in a fashion which produces the desired above-described operation.

BRIEF DESCRIPTION OF THE DRAWINGS

FIG. 1 is a front view of the indicator of the present invention; and

FIG. 2 is a schematic diagram of the electronic circuitry for energizing the indicator lights of FIG. 1 in a desired fashion.

DETAILED DESCRIPTION OF THE PREFERRED EMBODIMENTS

In FIG. 1, a mounting plate 10 is shown having mounting apertures 11, 12, 13 and 14 in the corners thereof for attaching to a suitable surface on a boat. Mounted in a suitable aperture 15 of the mounting plate 10 is an indicator face plate 17 through which four lights 20, 21, 22 and 23 may be viewed. As described above, lights 20, 21, 22 and 23 may be any suitable pair of colors, such as red and green, so long as they are distinguishable. An off/on knob 25 is show with suitable markings 26 on the faceplate 17 for turning the system on and off.

To indicate a full port position, lights 20, 21, 22 and 23 will glow red. At three-fourths full port, lights 20, 21 and 22 will glow red and light 23 will be extinguished. At half full port position, lights 20 and 21 will glow red, and lights 22 and 23 will be extinguished. At one-fourth full port position, light 20 will glow red and lights 21, 22 and 23 will be extinguished. At the neutral, or half-way between full port and full starboard position, light 20 will continue glowing red, but now light 23 will energize and will start glowing green while lights 21 and 22 will be extinguished. At the one-fourth full starboard position, light 20, as well as lights 21 and 22, will be extinguished and light 23 will continue glowing green. At the one-half full starboard position, lights 22 and 23 will glow green, and lights 20 and 21 will be extinguished. At three-fourths full starboard position, lights 21, 22 and 23 will glow green and light 20 will be extinguished. Finally, at the full starboard position, lights 20, 21, 22 and 23 will all glow green. Thus, an orderly progression from all red to all green occurs with each step uniquely indicating one of nine different rudder positions.

The circuit used for causing the above operation will now be described in connection with FIG. 2. In FIG. 2, the boat's battery 30, which is usually a 12 volt storage battery, is shown having its negative terminal connected to a grounded junction point 32 and its positive terminal connected to one side of an on/off switch 34 which is shown connected by a dashed line connection 35 to the actuator knob 25 of FIG. 1. The other side of switch 34 is connected to one terminal of a reverse voltage protection diode 38, the other terminal of which is connected to a junction point 40. Diode 38 is directional so as to allow current flow from the positive terminal of battery 30 to junction point 40 when switch 34 is closed and to prevent current flow in the opposite direction.

Junction point 40 is connected to a filter capacitor 42 the other side of which is connected to ground and junction point 40 is also connected to an output terminal 44 for supplying an energizing voltage from battery 30 to several of the electronic components of the system, as will be hereinafter described.

Junction point 32 is connected through a resistor 46 to a junction point 48, and junction point 48 is connected through a resistor 50 to a junction point 52. Connected between junction points 40 and 48 is a voltage regulator VR1 identified by reference numeral 55. Resistors 48 and 50 bias voltage regulator 55 to a regulated voltage, and voltage regulator 55 produces a regulated output voltage on a conductor 58 connected to the junction point 52. Junction point 52 is connected through an output filter capacitor 60 to ground, and junction point 52 is also connected to a junction point 62 where the regulated voltage output from the voltage regulator 55 is applied to the circuitry for controlling the lights.

In one useful embodiment of the voltage regulator circuit, the battery voltage is assumed to be 12 volts; resistor 46 is 1.27 kOhms; resistor 50 is 232 Ohms; capacitor 42 is 0.10 microfarads; capacitor 60 is 1 microfarad; and the voltage regulator is a LM317LZ manufactured by National Semiconductor, Inc. With this arrangement, the regulated voltage at points 52 and 62 is approximately 8 volts.

On the right side of FIG. 2, a rudder 70 is shown connected by a mechanical connection shown as dashed line 72 to the wiper 74 of a potentiometer 76 having a resistance winding 78. For purposes of explanation, the length of resistance winding 78 has been marked off to show the position of wiper 74 thereon when the rudder is at full port (FP), three-fourths port (¾ P), one-half full port (½ P) one-fourth full port (¼ P), neutral (N), one-fourth full starboard (¼ S), one-half full starboard (½ S), three-fourths full starboard (¾ S) and full starboard (FS).

Wiper 74 is connected to a junction point 80 which in turn is connected through a filter capacitor 81 to ground. Junction point 80 is also shown connected to a junction point 82. The upper end of the resistance winding 78 is connected through a resistor 84 to the junction point 62. The lower end of resistance winding 78 is connected through a resistor 86 to a grounded junction point 88.

A series of nine resistors are connected between junction points 62 and 88 as follows: a resistor 90 is connected between junction point 62 and a junction point 92, a resistor 94 is connected between junction point 92 and a junction point 96, a resistor 98 is connected between junction point 96 and a junction point 100, a resistor 102 is connected between junction point 100 and a junction point 104, a resistor 106 is connected between junction point 104 and a junction point 108, a resistor 110 is connected between junction point 108 and a junction point 112, a resistor 114 is connected between junction point 112 and a junction point 116, a resistor 118 is connected between junction point 116 and a junction point 120, and a resistor 122 is connected between junction point 120 and junction point 88. In one useful embodiment of the invention, resistors 90 and 112 have a value of 1.5 kOhms, while resistors 94-118 have a value of 1 kOhm each. Accordingly, with the assumed regulated voltage at junction point 62 being 8 volts, the voltage at junction point 92 will be approximately 6.8 volts, the voltage at junction point 96 will be about 6.0 volts, the voltage at junction point 100 will be approximately 5.2 volts, the voltage at junction point 104 will be approximately 4.4 volts, the voltage at junction point 108 will be approximately 3.6 volts, the voltage at junction point 112 will be approximately 2.8 volts, the voltage at junction point 116 will be approximately 2.0 volts, and the voltage at junction point 120 will be approximately 1.2 volts.

Similarly, on the right side of FIG. 2 resistors 84 and 86 may be 56 Ohms each and potentiometer winding 78 may be 1,000 Ohms. With this arrangement, the voltage at the upper end of full starboard (FS) will be about 7.6 volts, the voltage at the upper end of ¾ S will be approximately 6.8 volts, the voltage at the upper end of ½ S will be approximately 6.0 volts, the voltage at the upper end of ¼ S will be approximately 5.2 volts, the voltage at the upper end of the neutral range (N) will be approximately 4.4 volts, the voltage at the lower end of the neutral range will be approximately 3.6 volts, the voltage at the lower end of ¼ P will be approximately 2.8 volts, the voltage at the lower end of ½ P will be approximately 2.0 volts, the voltage at the lower end of ¼ P will be approximately 1.2 volts, and the voltage at the lower end of full port (FP) will be approximately 0.4 volts.

It is, of course, again to be understood that the various voltages and resistance values used above are a matter of design choice, and other values and other voltages may easily be employed.

FIG. 2 also shows eight voltage comparators identified by reference numerals 130, 131, 132, 133, 134, 135, 136 and 137, each of which has a positive and a negative input terminal. The negative input terminal of comparator 130 is shown connected to junction point 108, the negative input terminal of comparator 131 is shown connected to junction point 100, the negative input terminal of comparator 132 is shown connected to junction point 96, the negative input terminal of comparator 133 is shown connected to junction point 92, the positive input terminal of comparator 134 is shown connected to junction point 120, the positive input terminal of comparator 135 is shown connected to junction point 116, the positive input terminal of comparator 136 is shown connected to junction point 112, and the positive input terminal of comparator 137 is shown connected to junction point 104. The positive input terminals of comparators 130, 131, 132 and 133 are all connected together to junction point 82, and the negative input terminals of comparators 134, 135, 136 and 137 are all connected together to junction point 82. Accordingly, whatever voltage is on wiper 74 will appear on the positive input terminals of comparators 130-133 and on the negative inputs of comparators 134-137. The negative input terminals of comparators 130-133 will have the voltages of junction points 108, 100, 96 and 92, respectively, as described above, and the positive input terminals of comparators 134-137 will have the voltages of junction points 120, 116, 112 and 104, respectively, as described above.

Each of the comparators 130-137 operates to produce an output whenever the voltage at the positive input terminal thereof exceeds the voltage at the negative input terminal thereof. Whenever the voltage at the negative input terminal of a comparator is equal to or greater than the voltage at the positive input terminal there will be no output from the comparator. Each of the comparators 130-137 also has a connection to terminal 44 of the voltage regulator circuit which, as explained above, is connected to the positive terminal of battery 30 when switch 34 is closed, and each of the comparators has a connection to ground.

The output terminal of comparator 130 is connected through a resistor 140 to the upper terminal of the light 20, the lower terminal of which is connected to the output terminal of comparator 134. The output terminal of comparator 131 is connected through a resistor 141 to the upper terminal of the light 21, the lower terminal of which is connected to the output terminal of comparator 135. The output terminal of comparator 132 is connected through a resistor 142 to the upper terminal of the light 22, the lower terminal of which is connected to the output terminal of comparator 136. The output terminal of comparator 133 is connected through a resistor 143 to the upper terminal of the light 23, the lower input terminal of which is connected to the output terminal of comparator 137.

Each of the lights 20-23 is composed of two different colored light emitting elements such as light emitters 145, all of which may be green when energized, and light emitters 147, all of which may be red when energized. The light emitters 145 and 147 used in the preferred embodiment are of the light emitting diode (LED) type with one red and one green in a single package. Of course, alternate arrangements of lights may be employed so long as there are discernable color differences between the light emitters 145 and 147.

It will be seen that with the voltages as described above, when the wiper 74 is in the full starboard position the voltage on wiper 74 will be between 7.6 volts and 6.8 volts. Accordingly, the positive input terminals of each of the comparators 130-133 and the negative input terminals of each of the comparators 134-137 will receive voltages in the 7.6 to 6.8 volt range. Since the negative input terminals of comparators 130-133 are connected to junction points 108, 100, 96 and 92 and since the voltages at these junction points are all smaller than the 7.6 to 6.8 volt range, the positive inputs for each of the comparators 130-133 will be greater than the negative inputs and, accordingly, each of these comparators will produce an output. Similarly, since the positive input terminals of comparators 134-137 are connected to junction points 104, 112, 116 and 120, and since all of the voltages on these junction points are less than 7.6 to 6.8 volts in range, the negative inputs for each of the comparators 134-137 will be greater than the positive inputs and, accordingly, there will be no output from these comparators. In this event, with an output from the upper comparators 130-133 and no output from the lower comparators 134-137, current will flow through lights 20, 21, 22 and 23 downwardly in FIG. 2 through diodes 147 and, accordingly, all four of the lights 20-23 will be energized and will be green.

When wiper 74 is at the three-fourths full starboard position (¾ S), the voltage thereon will be between 6.8 and 6.0 volts and, accordingly, the positive input terminals of comparators 130-133 will receive the 6.8 to 6.0 volt range as will the negative input terminals of comparators 134-137. Here again, junction points 108, 100 and 96, which are connected to the negative input terminals of comparators 130-132, will be smaller than the positive inputs and, accordingly, these three comparators will continue to produce an output. The negative input terminal of comparator 133, however, is connected to junction point 92 which has a voltage of 6.8 volts and, accordingly, the two inputs thereto will be equal or the negative input greater, in either of which events there will be no output from comparator 133. Comparators 134-137 will still all have positive inputs less than the negative input from wiper 74 and, accordingly, all of these will continue to be off. In such event, lights 20, 21 and 22 will continue to be energized in green, but light 23 will be off.

At one-half full starboard, the voltage on wiper 74 is between 6.0 and 5.2 volts, and now comparators 130 and 131 receive positive input voltages which exceed the negative voltages on their inputs and they will continue to produce outputs, but comparator 132 has a negative input connected to the 6.0 volt junction point 96 and, accordingly, will stop producing an output. Comparators 134-137 will still have negative inputs which exceed their positive inputs and, accordingly, all of these will remain off. It is seen in this case that lights 20 and 21 will continue to produce a green signal, but lights 22 and 23 will be off.

At one-fourth full starboard position, the voltage on wiper 74 drops to between 5.2 and 4.4 volts. Since the negative input terminal of comparator 131 is connected to junction point 100, it receives 5.2 volts and will now produce no output. Only comparator 130 will continue to produce an output. Again, the lower comparators 134-137 will produce no outputs and so only light 20 will continue to glow green while light 21, 22 and 23 will be off.

Starting with the upper neutral position of wiper 74, where the voltage on wiper 74 is 4.4 volts, to the lower neutral position of wiper 74 where the voltage on wiper 74 is 3.6 volts, the negative voltages on comparators 131-133 will continue to be greater than the positive voltages thereon and, accordingly, they will continue to have no output. Comparator 130 will, however, until wiper 74 has passed the lower neutral position, continue to have a voltage on the positive input which exceeds the voltage on the negative input at junction point 108 and, accordingly, comparator 130 will continue to produce an output. Comparator 137, on the other hand, will now have a positive input from junction point 104 which exceeds the voltage on wiper 74 when in the neutral range and, accordingly, comparator 137 will produce an output and now, since comparator 133 is not producing an output, current flows upwardly through light 23 and red LED 145 will now be energized. It is therefore seen that in the neutral position light 20 will glow green while light 23 will glow red.

As the wiper moves to the one-fourth full port position, the voltage thereon becomes 2.8 volts and so the voltage on the negative input terminal of all of the upper comparators 130-133 is greater than the voltage on the positive input, and they will now all produce no output thereby extinguishing light 20. Similarly, the voltages on the negative inputs of comparators 134-136 will exceed the voltage on the positive inputs thereto and they too will produce no voltage. However, comparator 137 will still have a voltage on its positive input greater than the voltage on its negative input, and it will continue to produce an output thereby causing current to flow through diode 145 and turning it on in red status.

As the wiper moves to one-half full port, the voltage drops to 2.0 volts, and now the voltages on the positive inputs of both comparators 136 an 137 will exceed the voltage on the negative inputs thereto, and lights 22 and 23 will glow red.

At three-fourths full port, the voltage on wiper 74 drops to 1.2 volts, and now the voltages on the positive inputs of comparators 135, 136 and 137 exceed the voltages on the negative inputs and lights 21, 22 and 23 will glow red.

Finally, at the full port position, the voltage on wiper 74 drops to 0.4 volts and now all of the positive inputs of comparators 134-137 exceed the negative inputs and all four lights 20-23 will turn red indicating full port.

It is seen that I have provided a unique rudder position indicator which avoids the problems in the prior art, is easy and inexpensive to construct and provides for error-free and more accurate indication.

Although the present invention has been described with reference to preferred embodiments, workers skilled in the art will recognize that changes may be made in form and detail without departing from the spirit and scope of the invention.

What is claimed is:

1. A rudder position indicator comprising:
    a plurality of lights mounted in a row with each light being energizable in a first or a second color; and
    connection means connecting the lights to the rudder so that when the rudder is at full starboard all lights are energized in the first color, when the rudder is in the neutral position only the outer ones of the plurality of lights are energized, one in the first color and one in the second color, and when the rudder is at full port all lights are energized in the second color.

2. Apparatus of claim 1 wherein the plurality of lights comprise first, second, third and fourth light-emitting diode connection means and wherein the means operates to turn on diodes one, two, three and four in the first color when the rudder is at full starboard, diodes one, two and three in the first color when the rudder is at three-fourths full starboard, diodes one and two in the first color when the rudder is at one-half full starboard, diode one in the first color when the rudder is one-fourth full starboard, diode one in the first color and diode four in the second color when the rudder is in neutral, diode four in the second color when the rudder is at one-fourth full port, diodes four and three in the second color when the rudder is at one-half full port, diodes four, three and two in the second color when the rudder is at three-fourths full port, and diodes four, three, two and one in the second color when the rudder is at full port.

3. Apparatus of claim 2 wherein the light-emitting diode means each include first and second diodes, a first of which is energized when a potential difference exists across the diode means in a first direction and the second of which is energized when a potential difference exists across the diode means in a direction opposite the first direction with the first and second diodes having opposite colors when energized.

4. Apparatus of claim 3 wherein the diode means is de-energized so that no color appears when the potential across the diode means is substantially zero.

5. Apparatus of claim 1 wherein each of the lights has first and second inputs and further including first comparator means connected to a source of reference voltage and to a voltage variable with rudder position to provide a signal to the first input whenever the voltage indicative of rudder position exceeds the reference voltage and second comparator means connected to a source of reference voltage and to the source of voltage variable with rudder position and operable to produce a signal to the second input whenever the reference voltage exceeds the voltage indicative of rudder position.

6. Apparatus for indicating the position of a member which is movable between first and second positions comprising:
    first and second signalling means operable in one or the other of two mutually distinguishable modes;
    energizing means energizing the first and second signalling means exclusively in the first mode when the member is proximate the first position, energizing the first signalling means exclusively in the first mode of the second signalling means exclusively in the second mode when the member is proximate a third position halfway between the first and second positions; and
    energizing the first and second signalling means exclusively in the second mode when the member is proximate the second position.

7. The apparatus of claim 6 further including third signalling means and wherein said energizing means energizes the first, second and third signalling means in the first mode when the member is proximate the first position, energizes the first and third signalling means in the first mode and de-energizes the second signalling means when the member is proximate a fourth position between the first and third positions, energizes the first signalling means in the first mode and de-energizes the second and third signalling means when the member is proximate a fifth position between the fourth and third positions, energizes the second signalling means in the second mode and de-energizes the first and third signalling means when the member is proximate a sixth position between the third position and the second position, and energizes the second and third signalling means in the second mode when the member is proximate a seventh position between the sixth and second positions.

8. The apparatus according to claim 6 wherein the signalling means are lights and the modes are first and second colors.

9. The apparatus according to claim 7 wherein the signalling means are lights and the modes are first and second colors.

10. The method of indicating rudder position with a plurality of lights arranged in a row comprising the steps of:
    causing all lights to glow in a first color when the rudder is in a full starboard position;
    causing the light on the first end of the row to extinguish as the rudder moves away from the full starboard position toward a full port position;
    causing the light on the first end to glow in the first color and the light on the second end to glow in a second color when the rudder is in a neutral position halfway between full starboard and full port;
    causing all lights to glow in the second color when the rudder is in the full port position; and
    causing the light on the second end of the row to extinguish as the rudder moves away from the full port position toward the full starboard position.

11. The method of claim 10 further including the steps of causing the two lights nearest the first end to extinguish as the rudder approaches a position halfway between the full starboard position and the neutral position, and causing the two lights nearest the second end to extinguish as the member approaches a position halfway between the full port position and the neutral position.

12. Apparatus for indicating the position of a member movable between first and second positions comprising:
    a variable source of voltage for supplying a voltage of magnitude which varies from a maximum when the member is proximate the first position to a minimum when the member is proximate the second position;

a plurality of reference voltage sources supplying a plurality of voltages between the maximum and the minimum;

a plurality of voltage comparators each having a first input connected to the variable source of voltage and a second input connected to a different one of the reference voltage sources, each voltage comparator operable to produce an output signal whenever a predetermined one of its inputs receives a voltage greater than the other of its inputs; and a plurality of signalling means each energizable in either first or second modes, said plurality of signalling means being connected to said plurality of voltage comparators to receive the outputs therefrom so as to energize the plurality of signalling means in the first mode when the member is proximate the first position, to energize the plurality of signalling means in the second mode when the member is proximate the second position and to energize a first predetermined one of the signalling means in the first mode and a second predetermined one of the signalling means in the second mode when the member is proximate a halfway position between the first and second positions.

13. The apparatus according to claim 12 wherein the plurality of signalling means are lights and the first and second modes are colors.

14. The apparatus according to claim 12 wherein the variable source of voltage is a potentiometer having a wiper connected to the member and the plurality of reference voltage sources comprises a resistance having a plurality of taps.

15. The apparatus of claim 14 wherein the member is the rudder of a boat.

16. A rudder position indicator comprising:
a source of regulated voltage of predetermined magnitude;

a resistor having eight equally spaced taps connected across the source of regulated voltage so that each tap supplies a voltage which is 12.5% of the predetermined magnitude different from the next nearest tap thereto;

a potentiometer having a resistance winding connected across the source of regulated voltage and a movable wiper connected to the rudder;

a first comparator having a positive input connected to the wiper and a negative input connected to the tap supplying the highest voltage, said first comparator producing an output signal only when the voltage at its positive input exceeds the voltage at its negative input;

a second comparator having a positive input connected to the wiper and a negative input connected to the tap supplying the second highest voltage, said second comparator producing an output signal only when the voltage at its positive input exceeds the voltage at its negative input;

a third comparator having a positive input connected to the wiper and a negative input connected to the tap supplying the third highest voltage, said third comparator producing an output signal only when the voltage at its positive input exceeds the voltage at its negative input;

a fourth comparator having a positive input connected to the wiper and a negative input connected to the tap supplying the fifth highest voltage, said fourth comparator producing an output signal only when the voltage at its positive input exceeds the voltage at its negative input;

a fifth comparator having a negative input connected to the wiper and a positive input connected to the tap supplying the fourth highest voltage, said comparator producing an output signal only when the voltage at its positive input exceeds the voltage at its negative input;

a sixth comparator having a negative input connected to the wiper and a positive input connected to the tap supplying the sixth highest voltage, said comparator producing an output signal only when the voltage at its positive input exceeds the voltage at its negative input;

a seventh comparator having a negative input connected to the wiper and a positive input connected to the tap supplying the seventh highest voltage, said comparator producing an output signal only when the voltage at its positive input exceeds the voltage at its negative input;

an eighth comparator having a negative input connected to the wiper and a positive input connected to the tap supplying the eighth highest voltage, said eighth comparator producing an output signal only when the voltage at its positive input exceeds the voltage at its negative input;

first, second, third, fourth, fifth, sixth, seventh and eighth light emitting diodes; and means connecting the first and fifth diodes between the outputs of the first and fifth comparators, the second and sixth diodes between the outputs of the second and sixth comparators, the third and seventh diodes between the outputs of the third and seventh comparators and the fourth and eighth diodes between the outputs of the fourth and eighth comparators, the first, second, third and fourth diodes glowing in a first color only when they receive an output from the first, second, third and fourth comparator, respectively, and no output from the fifth, sixth, seventh and eighth comparators, respectively, the fifth, sixth, seventh and eighth diodes glowing in a second color only when they receive an output from the fifth, sixth, seventh and eighth comparators, respectively, and no output from the first, second, third and fourth comparators, respectively.

17. Apparatus for indicating the position of a member which is movable between first and second positions comprising:
first and second lights, each being energizable in either of two mutually distinguishable colors; and energizing means for applying a voltage of a first polarity to the first and second lights to energize the first and second lights in the first color when the member is proximate the first position, for applying a voltage of the first polarity to the first light and of a second polarity to the second light to energize the first light in the first color and the second light in the second color when the member is between the first and second positions, and for applying a voltage of the second polarity to the first and second lights to energize the first and second lights in the second color when the member is proximate the second position.

* * * * *

UNITED STATES PATENT AND TRADEMARK OFFICE
CERTIFICATE OF CORRECTION

PATENT NO. : 4,912,465
DATED : March 27, 1990
INVENTOR(S) : Gary M. Greer

It is certified that error appears in the above-identified patent and that said Letters Patent is hereby corrected as shown below:

Column 7, line 28, delete "connection" before "means" (first occurrence) and insert --connection-- before "means" (second occurrence).

Column 7, line 32, delete "three-fourths" and insert --three-quarters--.

Column 7, line 35, delete "one-fourth" and insert --one-quarter--.

Column 7, line 38, delete "one-fourth" and insert --one-quarter--.

Column 7, line 41, delete "three-fourths" and insert --three-quarters--.

UNITED STATES PATENT AND TRADEMARK OFFICE
CERTIFICATE OF CORRECTION

PATENT NO. : 4,912,465

DATED : March 27, 1990

INVENTOR(S) : Gary M. Greer

It is certified that error appears in the above-identified patent and that said Letters Patent is hereby corrected as shown below:

Column 8, line 7, delete "of" and insert --and--.

Signed and Sealed this

Twenty-third Day of July, 1991

*Attest:*

HARRY F. MANBECK, JR.

*Attesting Officer*     *Commissioner of Patents and Trademarks*